United States Patent
Zhang

(10) Patent No.: US 11,662,682 B2
(45) Date of Patent: May 30, 2023

(54) METHOD, APPARATUS, AND SYSTEM FOR DETECTING A PRINTER MEDIA JAM BASED ON A REFLECTANCE CHARACTERISTIC

(71) Applicant: Hand Held Products, Inc., Charlotte, NC (US)

(72) Inventor: Wenwei Zhang, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/175,351

(22) Filed: Feb. 12, 2021

(65) Prior Publication Data

US 2022/0260948 A1 Aug. 18, 2022

(51) Int. Cl.
*G03G 15/00* (2006.01)
*G06F 3/12* (2006.01)

(52) U.S. Cl.
CPC ......... *G03G 15/55* (2013.01); *G03G 15/5016* (2013.01); *G06F 3/121* (2013.01)

(58) Field of Classification Search
USPC ............................................................ 399/9
See application file for complete search history.

(56) References Cited

U.S. PATENT DOCUMENTS

| | | | |
|---|---|---|---|
| 5,615,876 A | 4/1997 | Yergenson et al. | |
| 6,201,255 B1 | 3/2001 | Torchalski et al. | |
| 6,698,951 B2 | 3/2004 | Kitai et al. | |
| 8,801,308 B2 * | 8/2014 | Cole | G03G 15/6529 400/582 |
| 10,479,113 B1 * | 11/2019 | Hatle | B41J 11/485 |
| 2009/0244169 A1 | 10/2009 | Kojima | |
| 2013/0308966 A1 * | 11/2013 | Masuda | G03G 15/2039 399/33 |
| 2016/0221364 A1 | 8/2016 | Hoshino | |
| 2019/0018360 A1 | 1/2019 | Chen et al. | |
| 2019/0171152 A1 * | 6/2019 | Sakakibara | B65H 5/06 |

FOREIGN PATENT DOCUMENTS

JP 04051070 A * 2/1992
JP 07311511 A * 11/1995

OTHER PUBLICATIONS

European search report dated Jul. 8, 2022 for EP Application No. 22156076.

* cited by examiner

Primary Examiner — Quana Grainger
(74) Attorney, Agent, or Firm — Alston & Bird LLP

(57) ABSTRACT

Various embodiments disclose a method of detecting a media jam in a printer. The method includes causing a sensor unit of the printer to generate a sensor signal indicative of a reflectance characteristic associated with a surface of a roller of the printer. Further, the method includes receiving the sensor signal from the sensor unit of the printer and comparing the reflectance characteristic to a threshold reflectance characteristic associated with the roller. Furthermore, in response to the comparison, the method includes generating an output signal to indicate whether the media jam has occurred. For example, a first output signal indicates unsuccessful passage of a media along a media path of the printer, when the reflectance characteristic exceeds the threshold reflectance characteristic and a second output signal indicates successful passage of the media along the media path, when the reflectance characteristic is equal to or below the threshold reflectance characteristic.

16 Claims, 6 Drawing Sheets

METHOD, APPARATUS, AND SYSTEM FOR DETECTING A PRINTER MEDIA JAM BASED ON A REFLECTANCE CHARACTERISTIC

TECHNICAL FIELD

Example embodiments of the present disclosure relate generally to a printer, more particularly, to detecting a media jam in the printer.

BACKGROUND

A conventional printer comprises one or more media sensors that are used to determine various aspects associated with a media traversing along a media path of the printer, to ensure uninterrupted functioning of the printer. For example, a media sensor may detect presence or absence of the media or a position of the media on the media path, another media sensor may detect a media type, yet another form of a media sensor may detect weight of a media roll supplying the media, a diameter of the media roll, etc.

BRIEF SUMMARY

Exemplary embodiments of the present disclosure relate generally to a printer and, more particularly, to methods, and systems for operating the printer.

Various embodiments described herein illustrate an apparatus for detecting a media jam in a printer. The apparatus comprises a sensor unit configured to be positioned downstream of a media hub of the printer and proximate to a roller of the printer. The sensor unit is configured to generate a sensor signal indicative of a reflectance characteristic associated with a surface of the roller. The sensor unit comprises a light emitter and a light detector. The light emitter is configured to project incident light on the surface of the roller. The light detector is configured to detect reflected light from the surface of the roller in response to the incident light. A processor is communicatively coupled to the sensor unit. The processor is configured to receive, from the sensor unit, the sensor signal indicative of the reflectance characteristic associated with the surface of the roller. The processor compares the reflectance characteristic to a threshold reflectance characteristic associated with the roller. In response to the comparison, the processor generates an output signal to indicate whether the media jam has occurred. The output signal may correspond to a first output signal indicating unsuccessful passage of a media along a media path of the printer, when the reflectance characteristic exceeds the threshold reflectance characteristic. The output signal may correspond to a second output signal indicating successful passage of the media along the media path, when the reflectance characteristic is equal to or below the threshold reflectance characteristic.

Various embodiments described herein illustrate a printer comprising a media hub, a roller, a sensor unit, and a processor communicatively coupled to the sensor unit. The media hub is configured to supply a media along a media path. The roller is positioned downstream of the media hub along the media path. The roller is configured to cause the media to travel along the media path. The sensor unit is configured to be positioned downstream of the media hub and proximate to the roller. The sensor unit is configured to generate a sensor signal indicative of a reflectance characteristic associated with a surface of the roller. The processor is configured to receive, from the sensor unit, the sensor signal indicative of the reflectance characteristic associated with the surface of the roller. The processor compares the reflectance characteristic to a threshold reflectance characteristic associated with the roller. In response to the comparison, the processor generates an output signal to indicate whether the media jam has occurred. The output signal may correspond to a first output signal indicating unsuccessful passage of the media along the media path of the printer, when the reflectance characteristic exceeds the threshold reflectance characteristic. The output signal may correspond to a second output signal indicating successful passage of the media along the media path, when the reflectance characteristic is equal to or below the threshold reflectance characteristic.

Various embodiments described herein illustrate a method of detecting a media jam in a printer. The method comprises causing, by a processor of the printer, a sensor unit of the printer to generate a sensor signal indicative of a reflectance characteristic associated with a surface of a roller of the printer. The sensor unit is positioned downstream of a media hub of the printer and proximate to the roller. Further, the method comprises receiving, by the processor, the sensor signal from the sensor unit of the printer and comparing, by the processor, the reflectance characteristic to a threshold reflectance characteristic associated with the roller. In response to the comparison, the method comprises generating, by the processor, an output signal to indicate whether the media jam has occurred. The output signal may correspond to a first output signal indicating unsuccessful passage of a media along a media path of the printer, when the reflectance characteristic exceeds the threshold reflectance characteristic. The output signal may correspond to a second output signal indicating successful passage of the media along the media path, when the reflectance characteristic is equal to or below the threshold reflectance characteristic.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1A:
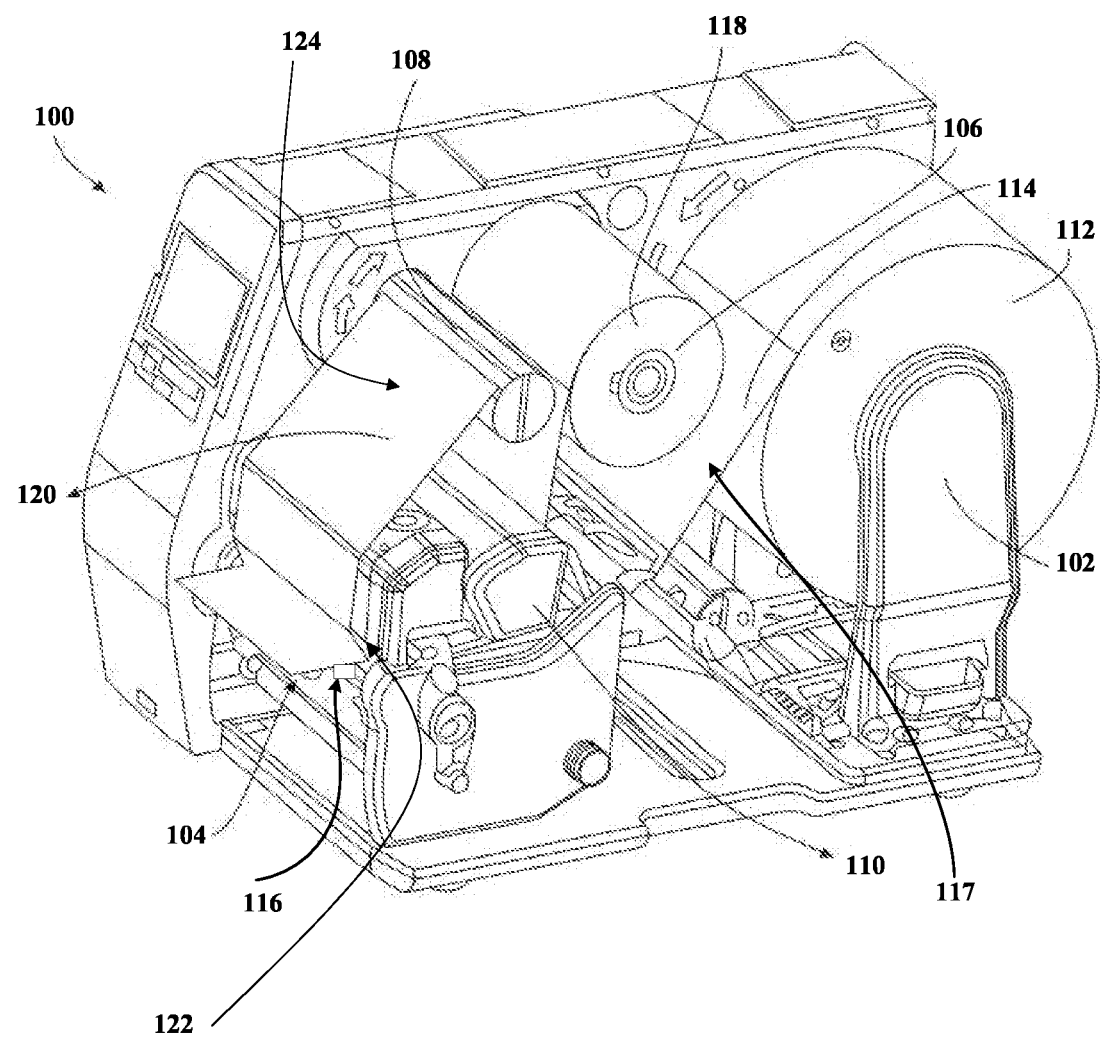
FIGS. 1A-1B exemplarily illustrate perspective views of a printer, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

In various example embodiments, the term "media" is used herein to mean a printable medium, such as a page or a paper, on which content, such as graphics, text, and/or visual images, may be printed. The media may correspond to a continuous media that may be loaded in a printer in the form of a roll or a stack. In some embodiments, the scope of the disclosure is not limited to having a continuous media. In some embodiments, the media may be divided into a plurality of labels through perforations defined along a width of the media. In some alternative embodiments, the media may be divided into the plurality of labels by one or more marks at a defined distance from each other along the length of the media. In an example embodiment, a contiguous stretch of the media between two consecutive marks or two consecutive perforations corresponds to a label of a plurality of labels. In some examples, each of the plurality of labels includes a printable portion on which content may be printed using a printer. In some implementations, the printable portion on the label may correspond to the complete label. In such an implementation, the content is printable on the complete label. In another implementation, an area of the printable portion is less than the area of the label. In some embodiments, the media may correspond to a thermal media on which the content is printed on application of heat on the media itself. In alternative embodiments, the media may correspond to a liner media, a liner-less media, and/or the like.

Printing systems, such as copiers, printers, facsimile devices or other systems, may be capable of reproducing content, visual images, graphics, texts, etc., on a page or a media. Some examples of the printing systems may include, but not limited to, thermal printers, inkjet printers, laser printers, and/or the like.

A typical thermal printer includes a thermal print head that has one or more heating elements. These heating elements may be individually or collectively energized to perform the printing operation. Examples of the thermal printers may include thermal transfer printers and direct thermal printers. Typically, in a thermal transfer printer, content is printed on the media by heating a coating of a ribbon so that the coating is transferred to the media. It contrasts with the direct thermal printing where no ribbon is present in the process. After the content is printed, the media is advanced along a media path to output the printed media from a printer media output defined in a housing of the printer. The outputted media may be torn automatically or manually using a tear bar.

In various embodiments of the present invention, the printer includes a media hub that is configured to receive a media roll. In some embodiments, the media roll may correspond to a roll of continuous media that may be loaded in the form of a roll or a stack. In other embodiments, the media roll corresponds to a roll of media that includes a plurality of labels. Each of the plurality of labels has a leading edge and a trailing edge. In some examples, the leading edge and the trailing edge of a label of the plurality of labels separate the label from the adjacent labels in the media. In some examples, the media hub causes the media to traverse along a media path. The printer further includes a print head that is positioned adjacent to the media path. In an example embodiment, the print head may be configured to print content on the media. For example, the print head may be configured to print content on a label of the plurality of labels. Post printing of the content on the label, the media hub causes the media to advance along the media path to output the printed label from the printer media output. Hereinafter, a direction of advancing of the media along the media path (for example, for printing and outputting the printed label) is referred to as a print direction.

In an example embodiment, the media hub is coupled to a motor unit that actuates the media hub. On actuation, the media hub causes the media roll to rotate, which further causes the media roll to supply the media to the print head along the media path of the printer.

Conventional printers include a variety of mechanisms, such as pickup rollers, feed rollers, platen rollers, etc., to allow traversal of the media along the media path through the printer and to control the media as it moves through the media path. Occasionally, the media may cause an obstruction in the media path, particularly around the printer rollers disposed in the media path or outside the media path, thereby causing a media jam in the printer and rendering the printer inoperative until the media jam is removed. Typically, clearing the media jam in the printer is a time consuming and laborious task for an end user. Various embodiments of the present disclosure provide an efficient method, system, and apparatus for timely detecting the media jam, thereby easing the process of clearing the media jam by the end user.

In some embodiments, the printer further includes a sensor unit. In an embodiment, the sensor unit comprises a light emitter and a light detector. In an example embodiment, the light emitter may correspond to a light source, such as a Light Emitting Diode (LED), a LASER, and/or the like. In an embodiment, the light emitter may be configured to project incident light on a surface of a roller of the printer. In an embodiment, the roller corresponds to any roller of the printer that is configured to facilitate a supply of the media from the media hub in the print direction along the media path. In an embodiment, the roller may correspond to a platen roller, a paper feed roller, a paper separation roller, a pickup roller, etc., of the printer. In an example embodiment, the light detector may correspond to at least one of a photodetector, a photodiode, or a photo resistor. In an embodiment, the light detector may be configured to detect reflected light from the surface of the roller in response to the incident light.

In some embodiments, the sensor unit is configured to generate a sensor signal indicative of a reflectance characteristic associated with a surface of the roller of the printer. In an embodiment, the "reflectance characteristic" may refer to a reflectance ratio indicating a measure of a proportion of incident light on a surface that is reflected off the surface. In an example embodiment, the reflectance ratio is calculated based on signals generated by the light emitter and the light detector of the sensor unit. In an embodiment, the reflectance characteristic is used to determine whether the surface of the roller of the printer is obstructed or unobstructed by the media supplied by the media hub, thereby indicating a media jam in the printer. In an embodiment, the surface of the roller may correspond to an unobstructed surface that is not blocked or jammed by the media and allows uninterrupted traversal of the media along the media path of the printer, or may correspond to an obstructed surface of the roller that is jammed by the media.

In some embodiments, the sensor unit is positioned downstream of the media hub of the printer. In other embodiments, the sensor unit may be positioned downstream of the print head with respect to the print direction or may be positioned upstream of the print head with respect to the print direction. In some embodiments, one or more sensor units are positioned between the media hub and the printer media output. In some other embodiments, the sensor unit is positioned between the print head and the printer media output, that is adjacent to the tear bar of the printer. In some embodiments, the sensor unit is disposed anywhere between the media hub and the printer media output such that the sensor unit faces any roller disposed adjacent to the media path. In yet other embodiments, the sensor unit is disposed outside the media path of the printer and yet facing any roller disposed along the media path of the printer to accurately determine the reflectance characteristic associated with a corresponding surface of the roller of the printer.

In an example embodiment, the printer includes a processor that is communicatively coupled to the one or more sensor units, the print head, and the motor unit. In some implementations, the processor is configured to control various operations of the printer. For example, the processor may be configured to cause the print head to print content on a label of the media. After the content is printed on the label, the processor causes the media hub to facilitate traversal of the media in the print direction along the media path in order to output the printed label from the printer media output. When the label is outputted, the outputted label of the media may be torn automatically or manually using the tear bar of the printer. In some example embodiments, during a media jam, the media gets jammed between the tear bar and the roller, thereby interrupting successful operation of the printer. In an example embodiment, the roller may correspond to a platen roller of the printer disposed proximate to the tear bar. In an example embodiment, the sensor unit may be positioned on the tear bar facing a surface of the roller that is proximate to the tear bar. In an embodiment, the scope of the disclosure is not limited to the media jam occurring between the tear bar and the roller. In some embodiments, the media jam may occur around any roller of the printer, and the sensor unit may be positioned facing the roller, without departing from the scope of the disclosure.

In an embodiment, the processor receives the sensor signal indicative of the reflectance characteristic associated with the surface of the roller from the sensor unit. In an embodiment, the processor compares the reflectance characteristic indicated in the sensor signal with a threshold reflectance characteristic to determine whether a media jam has occurred. In an embodiment, the threshold reflectance characteristic is determined based on a surface characteristic associated with the roller such as, material type, roller size, etc. Typically, the reflectance characteristic of a surface of a roller is less that the reflectance characteristic of a media. Accordingly, when the reflectance characteristic is equal to or below the threshold reflectance characteristic, the processor determines that the reflectance characteristic is indicative of the reflectance characteristic associated with the roller, thereby indicating successful passage of the media along the media path and resulting in no media jam. However, when the reflectance characteristic is greater that the threshold reflectance characteristic, the processor determines that the reflectance characteristic is indicative of the reflectance characteristic associated with the media, thereby indicating that the media jam has occurred.

In an embodiment, on occurrence of the media jam, the processor sends an output signal to the motor unit coupled to the media hub to stop the media hub from supplying the media along the media path. Therefore, after detecting the media jam, the media hub is stopped from supplying the media. As a result, various embodiments of the present invention eliminate the possibility of convoluted media jams, which allows a user to easily disentangle the jammed media, for example, between the roller and the tear bar, thereby eliminating the need of physically removing the roller from the printer to fix the media jam. Therefore, various embodiments of the present disclosure make the process of clearing media jams in printers less time consuming and unlaborious.

Figure 1B:
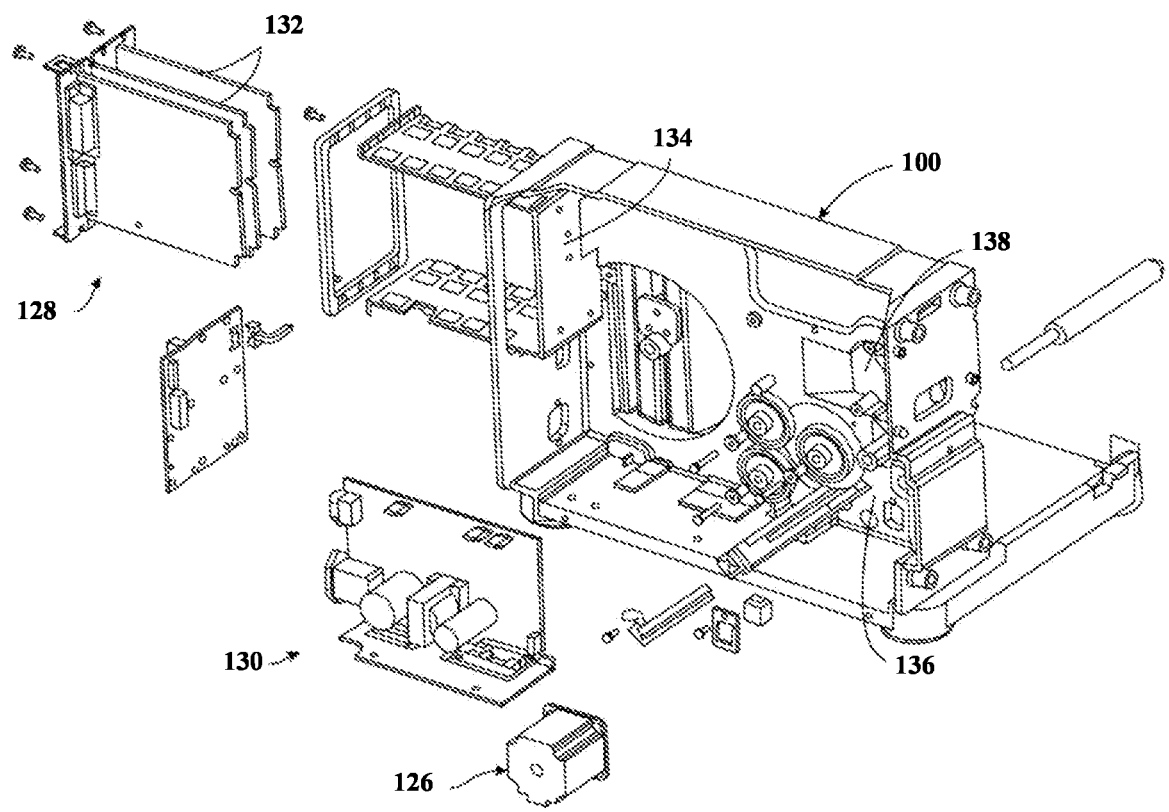

FIGS. 1A-1B exemplarily illustrate perspective views of a printer 100, according to one or more embodiments described herein. The printer 100 may include a media hub 102, a printer media output 104, a ribbon drive assembly 106, a ribbon take-up hub 108, a print head 110, a sensor unit 116, one or more rollers (exemplarily illustrated in FIGS. 2A and 2B), and a tear bar 122.

In an example embodiment, the media hub 102 is configured to receive a media roll 114. In an example embodiment, the media roll 114 may correspond to a roll of a media 112 that may be a continuous media or may, in some example embodiments, include a plurality of labels that are defined (in or on the media 112) by means of one or more perforations or one or more marks. In an example embodiment, the plurality of labels in or on the media 112 may correspond to portions on which the printer 100 may be configured to print content.

In an example embodiment, the media hub 102 is coupled to a motor unit (shown in FIGS. 2A-2B) that actuates the media hub 102. On actuation, the media hub 102 causes the media roll 114 to rotate, which further causes the media roll 114 to supply the media 112 to the print head 110 along the media path 117. In an example embodiment, along the media path 117, the media 112 traverses from the media roll 114 to the print head 110, the printer media output 104, and the tear bar 122. In such an embodiment, the direction of the media traversal is referred to as the print direction. In some examples, the media hub 102 may be actuated in such a manner that the media 112 traverses in a direction opposite to the print direction. Hereinafter, the direction of the media traversal opposite to the print direction is referred to as the retract direction.

In some example embodiments, the scope of the disclosure is not limited to the media hub 102 facilitating supply of the media 112 along the media path 117. In alternative embodiment, the printer 100 may further include one or more rollers (an example roller is further described in FIG. 2A and FIG. 2B), in addition to the media hub 102, that may be positioned along the media path 117. In such an embodiment, the rollers may be coupled to the motor unit, which actuates the rollers. On actuation, the rollers may be configured to pull the media 112 from the media roll 114 (mounted on the media hub 102), causing the media 112 to traverse along the media path 117. In some embodiments, the motor unit may be coupled to both the rollers and the media hub 102 such that both the rollers and the media hub 102 operate in synchronization. Such configuration of the printer 100 (that includes the rollers and the media hub 102) is further described in conjunction with FIG. 2A and FIG. 2B.

In an example embodiment, the printer media output 104 corresponds to a slot in a housing of the printer 100 through which the printed media 112 (for example, a printed label) is outputted. The width of the printer media output 104 is in accordance with a width of the media 112. In some examples, the width of the printer media output 104 may correspond to a maximum width of the media 112 supported by the printer 100.

The ribbon drive assembly 106 may receive a ribbon roll 118 that corresponds to a roll of a ribbon 120. In an example embodiment, the ribbon 120 may correspond to an ink media that is utilized to dispose ink onto the media 112 to print content on the media 112. In an example embodiment, the ribbon drive assembly 106 may be coupled to a first electrical drive (not shown) that may be configured to actuate the ribbon drive assembly 106. On actuation of the ribbon drive assembly 106, the ribbon drive assembly 106 rotates, which causes the ribbon roll 118 to rotate and supply the ribbon 120 along a ribbon path 124. Along the ribbon path 124, the ribbon 120 traverses from the ribbon roll 118 to the print head 110 and further to the ribbon take-up hub 108.

In an example embodiment, the ribbon take-up hub 108 may correspond to an assembly that may receive ribbon 120 (i.e., a section of the ribbon 120 from which the ink has been is disposed on the media 112). The ribbon take-up hub 108 may also be coupled to a second electrical drive (not shown) that may be configured to actuate the ribbon take-up hub 108. On actuation, the ribbon take-up hub 108 pulls the ribbon 120 from the ribbon roll 118. In some examples, the first electrical drive and the second electrical drive may operate in synchronization such that an amount of ribbon 120 released by the ribbon roll 118 (due to actuation of the first electrical drive) is equal to the amount of ribbon 120 received by the ribbon take-up hub 108.

The print head 110 may correspond to a component that is configured to print the content on the media 112. In an example embodiment, the print head 110 may include a plurality of heating elements (not shown) that are energized and pressed against the ribbon 120 to perform a print operation. In operation, the print head 110 applies heat on the section of the ribbon 120 and, concurrently, presses the ribbon 120 against the media 112 to transfer the ink on the media 112. To press the ribbon 120 against the media 112, the print head 110 travels in a vertically downward direction (or downward direction) to push the ribbon 120 against the media 112. In embodiments where the media 112 corresponds to thermal paper, the print head 110 may be directly pressed against the thermal paper to perform the print operation.

During the print operation, one or more heating elements of the plurality of heating elements are energized to perform the print operation. The one or more heating elements may be selected based on the data in a print job. For example, if a letter "A" is to be printed, the one or more heating elements that are energized are positioned on the print head 110 in such a manner that when the print head 110 is pressed against the ribbon 120 and the media 112, letter "A" gets printed on the media 112.

In an example embodiment, after the print operation, the media 112 and the ribbon 120 traverse along the media path 117 and the ribbon path 124, respectively, such that the printed media 112 traverses along the media path 117.

In an example embodiment, the printed media 112 is outputted from the printer media output 104. In an example embodiment, the media 112 traverses in the print direction along the media path 117 to output the printed media from the printer media output 104.

FIG. 1B exemplarily illustrates various electrical and drive components that may be secured to the opposite side of a central support member (chassis) of the printer 100. The electrical and drive components may include a stepper motor 126 of a stepper motor assembly, an electronic circuitry 128, and an electric drive assembly 130 that are secured to the central support member on a side opposite to the printing components. The electronic circuitry 128 may include one or more circuit boards 132, which may be installed in the printer 100 by sliding the circuit boards 132 through an opening 134, formed in the casing of the printer 100. The circuit boards 132 may be chosen to suit a specific printing operation to be performed. For example, the electronic circuitry 128 may be changed for different communications interfaces. Alternatively, software can be downloaded via a mechanism, such as COM port or CUPS printer driver, to control a specific printing application. There is further shown a first mounting location 136 and a second mounting location 138 that may be configured to receive the stepper motor assembly.

The stepper motor 126 in the stepper motor assembly may be configured to actuate the electrical drives, such as the motor unit, the first electrical drive, and/or the second electrical drive of various other assemblies as described above, and also a media drive (not shown), thereby controlling the traversal of the media 112 in the print direction and the retract direction. In an example embodiment, the actuation of the stepper motor 126 further actuates the motor unit that causes the media hub 102 to rotate, which in turn causes the media roll 114 to supply the media 112 along the media path 117. In an example embodiment, the actuation of the stepper motor 126 further actuates the first electrical drive that causes ribbon drive assembly 106 to rotate and supply the ribbon 120 along the ribbon path 124. In an example embodiment, the actuation of the stepper motor 126 further actuates the second electrical drive that may be configured to actuate the ribbon take-up hub 108.

In some examples, the scope of the disclosure is not limited to having a single stepper motor 126 in the printer 100. In an example embodiment, the printer 100 may include more than one stepper motor 126. For example, the printer 100 may include individual stepper motor(s) 126 for each of the motor unit, the first electrical drive, and the second electrical drive.

FIGS. 1A and 1B depict the printer 100 as the thermal transfer printer. In some embodiments, the scope of the disclosure is not limited to the printer 100 being a thermal transfer printer. In alternate embodiments, the printer 100 may correspond to a direct thermal, a laser printer, etc., without departing from the scope of the disclosure.

Figure 2A:
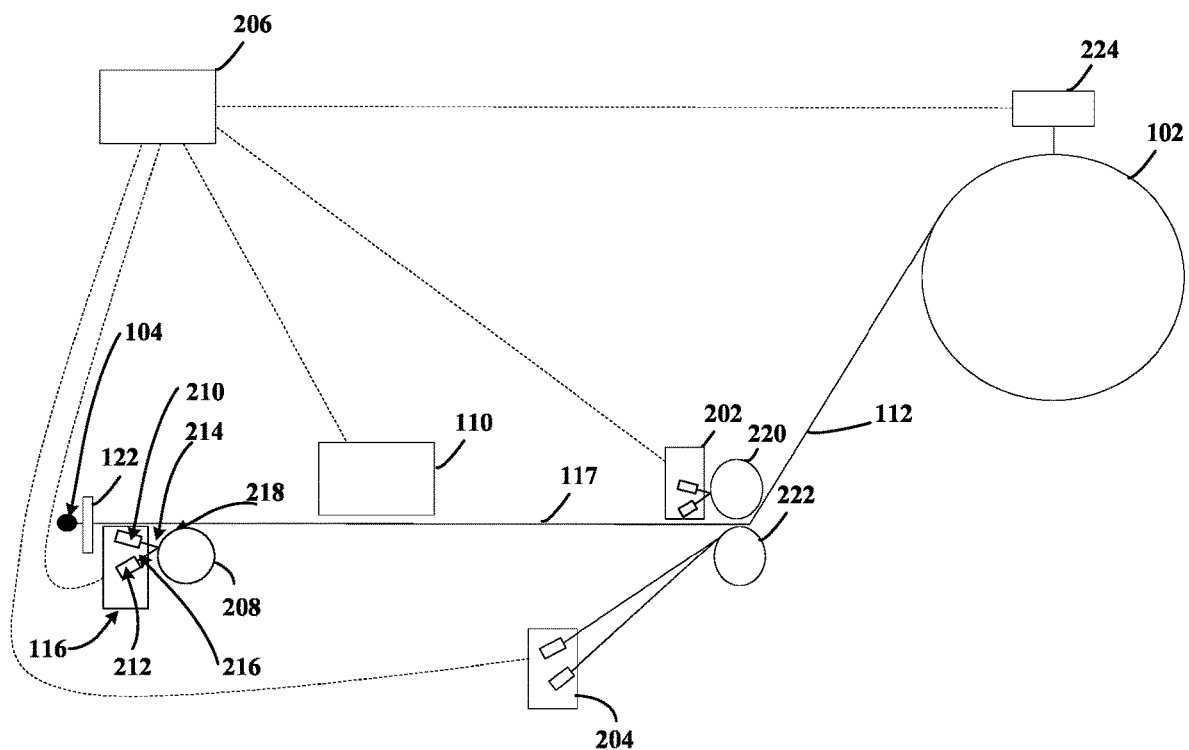
FIGS. 2A-2B exemplarily illustrate schematics of the printer, according to one or more embodiments described herein.
Figure 2B:
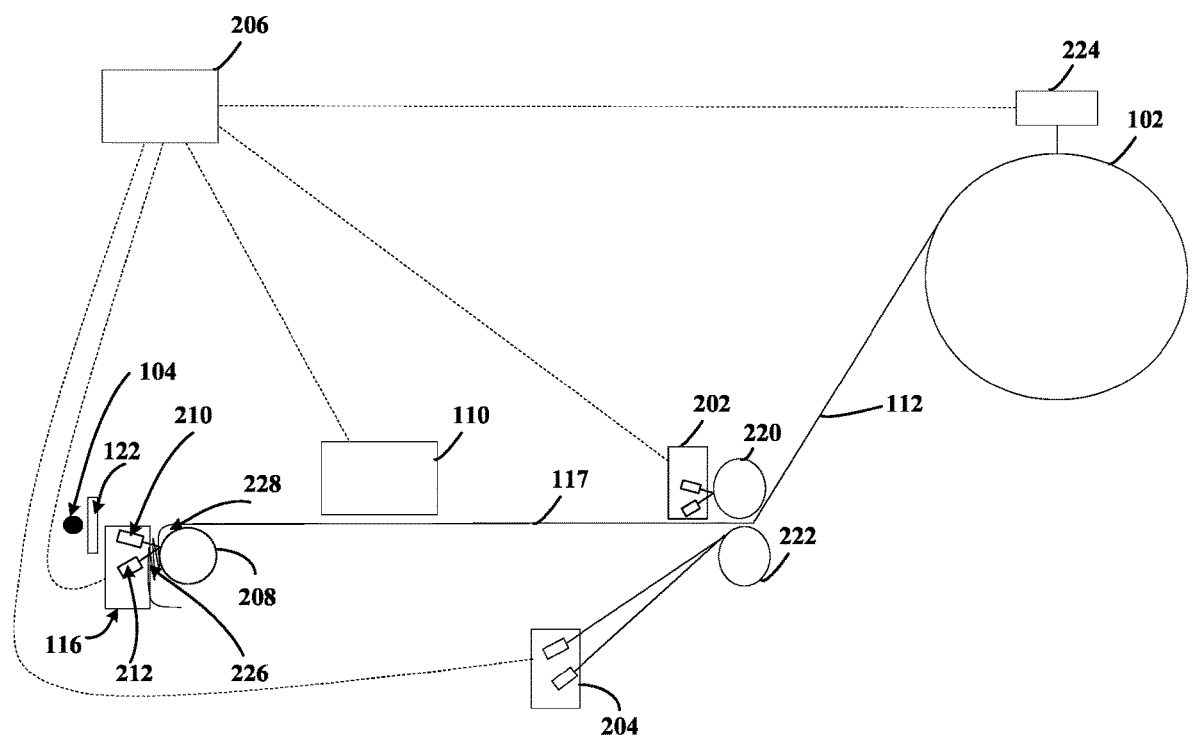

FIG. 2A and FIG. 2B exemplarily illustrate schematics of the printer 100, according to one or more embodiments described herein. As illustrated, the printer 100 includes the sensor units 116, 202, and 204, a control system 206, the motor unit 224, the media hub 102, one or more rollers 208, 220, and 222, the print head 110, and the tear bar 122. The schematic of the printer 100 further depicts the media path 117. Furthermore, the schematic of the printer 100 depicts that the print head 110 is positioned downstream of the media hub 102 in the print direction. In an example embodiment, the print head 110 is positioned on top of the media path 117.

During the print operation, the print head 110 moves in a vertically downward direction (orthogonal to the print direction) to press the ribbon 120 (exemplarily illustrated in FIG. 1A) against the media 112 to perform the print operation. More specifically, the print head 110 includes a burn line that heats the section of the ribbon 120 (while the ribbon 120 is pressed against the media 112) to perform the print operation. In some examples, the burn line includes a plurality of heating elements that are heated to perform the print operation.

In an example embodiment, the one or more rollers 208, 220, and 222 are positioned downstream of the media hub 102 along the media path 117 with respect to the print direction. In an embodiment, the one or more rollers 208, 220, and 222 may correspond to platen rollers, pickup rollers, media feeding rollers, separation rollers, etc. In an example embodiment, the rollers 220 and 222 are disposed downstream of the media hub 102 with respect to the print direction and upstream of the print head 110 with respect to the print direction, while the roller 208 is disposed downstream of the print head 110 with respect to the print direction and proximate to the tear bar 122, as exemplarily illustrated in FIGS. 2A and 2B. As described earlier in conjunction with FIGS. 1A and 1B, the rollers 208, 220, and 222 may be coupled to the motor unit 224 that enables the rollers 208, 220, and 222 to rotate and pull the media 112 from the media hub 102, and accordingly cause the media 112 to traverse along the media path 117.

In an embodiment, the sensor units 116, 202, and 204 are positioned downstream of the media hub 102 of the printer 100 and proximate to the rollers 208, 220, and 222, respectively. For example, the sensor unit 116 is positioned proximate to the roller 208, the sensor unit 202 is positioned proximate to the roller 220, and the sensor unit 204 is positioned proximate to the roller 222. As exemplarily illustrated in FIGS. 2A-2B, the sensor units 116, 202, and 204 may be positioned in the media path 117 of the printer 100 or outside the media path 117. For example, the sensor units 116 and 202 are positioned adjacent to the media path 117 and facing the rollers 208 and 220, respectively. While, the sensor unit 204 is positioned proximate to the roller 222 to face the roller 222 and outside the media path 117 and is configured to accurately detect the reflectance characteristic associated with the surface of the roller 222.

In an embodiment, the rollers 220 and 222 are similar to the roller 208 structurally and functionally. Hereinafter, the structures and functions of the rollers 208, 220, and 222 are described with reference to the roller 208 exemplarily illustrated in FIGS. 2A and 2B. In an embodiment, the sensor units 202 and 204 are similar to the sensor unit 116 structurally and functionally. For example, the sensor units 202 and 204 may be configured to generate respective sensor signals indicative of the reflectance characteristic associated with respective surfaces of the roller 220 and 222, respectively. Hereinafter, the structures and functions of the sensor unit 116, 202, and 204 are described with reference to the sensor unit 116 exemplarily illustrated in FIGS. 2A and 2B.

In an example embodiment, the sensor unit 116 may correspond to a media sensor that is configured to detect the presence of the media 112 on the surface 228 of the roller 208 to detect a probable media jam 226 caused by the media 112 obstructing the surface 228 of the roller 208, as exemplarily illustrated in FIG. 2B. In some example embodiments, the sensor unit 116 may be configured to detect the presence of the media 112 on the surface 218 of the roller 208 by determining the reflectance characteristic associated with the surface 218 of the roller 208. In an embodiment, the reflectance characteristic may correspond to transmissivity and/or reflectivity of the surface 218 of the roller 208. In an example embodiment, the transmissivity may correspond to a measurement of an intensity of the incident light 214 that the surface 218 of the roller 208 allows to pass through it. In an example embodiment, the reflectivity may correspond to a measurement of an intensity of the reflected light 216 that gets reflected from the surface 218 of the roller 208. In an example embodiment, a tab is operably coupled to the sensor unit and is configured to facilitate adjustment of a position of the sensor unit in relation to the roller based on a surface characteristic (e.g., the intensity of the reflected light) of a media configured to be supplied by the media hub of the printer.

In an embodiment, the surface 218 of the roller 208 may correspond to an unobstructed surface 218 of the roller 208 or an obstructed surface 228 of the roller 208. As used herein, the phrase "unobstructed surface 218 of the roller 208" refers to a surface 218 of the roller 208 that is not jammed by the media 112 and therefore facilitates uninterrupted traversal of the media 112 along the media path 117 of the printer 100 (i.e., the sensor is detecting the surface of the roller without media stuck to and/or on the surface of the roller). For example, the unobstructed surface 218 of the roller 208 is depicted in FIG. 2A, where the media 112 successfully travels along the media path 117 to be output at the printer media output 104. As used herein, the phrase "obstructed surface 228 of the roller 208" refers to a surface 228 of the roller 208 that is jammed by the media 112, and therefore, interrupts the traversal of the media 112 along the media path 117 of the printer 100. For example, the obstructed surface 228 of the roller 208 is depicted in FIG. 2B, where the media 112 is stuck between the surface 228 of the roller 208 and the sensor unit 116, which hinders the traversal of the media 112 along the media path 117 of the printer 100.

In an embodiment, the scope of the disclosure is not limited to the placement of the sensor unit 116, 202, or 204 being proximate and adjacent to the roller 208, 220, or 222, respectively. In alternate embodiments, the sensor unit 116, 202, or 204 may be positioned anywhere in the printer 100 to face the roller 208, 220, or 222, such that the sensor unit 116, 202, or 204 detects a media jam 226 in the printer 100, without departing from the scope of the disclosure. For example, the sensor unit 204 is disposed outside the media path 117 and facing the roller 222 to accurately determine the reflectance characteristic associated with an unobstructed or obstructed surface of the roller 222 and detect any media jam around the roller 222.

In an embodiment, the sensor unit 116 comprises a light emitter 210 and a light detector 212. The light emitter 210 may correspond to a light source, such as a Light Emitting Diode (LED), a LASER, and/or the like. The light emitter 210 may be configured to project incident light 214 on the surface 218 of the roller 208. The light detector 212 may correspond to at least one of a photodetector, a photodiode, or a photo resistor. The light detector 212 may be configured to detect reflected light 216 from the surface 218 of the roller 208 in response to the incident light 214. In an embodiment, the light detector 212 generates a sensor signal based on an intensity of the reflected light 216 received by the light detector 212. In an example embodiment, the sensor signal may correspond to a voltage signal, where the one or more characteristics of the voltage signal (such as the amplitude of the voltage signal and the frequency of the voltage signal) are directly proportional or inversely proportional to the intensity of the portion of the reflected light 216 received by the light detector 212.

Referring now to the embodiment exemplarily illustrated in FIG. 2A, the light emitter 210 of the sensor unit 116 may be configured to direct the incident light 214 on the surface 218 of the roller 208 which may be unobstructed by the media 112. Since the media 112 is absent from the surface 218 of the roller 208, a portion of the incident light 214 is reflected from the surface 218 of the roller 208. The light detector 212 may detect the reflected light 216 corresponding to a portion of the incident light 214 reflected from the surface 218 of the roller 208. Based on the intensity of the reflected light 216, the light detector 212 is configured to generate the sensor signal. Because the intensity of the portion of the incident light 214 reflected from the surface 218 of the roller 208 is dependent on the reflectivity of the roller 208, the sensor signal generated by the sensor unit 116 (based on the intensity of the reflected light 216) is indicative of a measurement of the reflectance characteristic of the surface 218 of the roller 208. In an embodiment, the sensor unit 116 transmits the sensor signal indicative of the reflectance characteristic associated with the surface 218 of the roller 208 to the processor of the printer 100. In an embodiment, the processor compares the reflectance characteristic to a threshold reflectance characteristic associated with the roller 208. For example, if the roller 208 is made of rubber material, the processor compares the reflectance characteristic to a threshold reflectance characteristic associated with the rubber material of the roller 208. In an embodiment, the processor generates a second output signal indicating successful passage of the media 112 along the media path 117, since the reflectance characteristic of the surface 218 of the roller 208 may be equal to or below the threshold reflectance characteristic of the rubber material of the roller 208.

Referring now to the embodiment exemplarily illustrated in FIG. 2B, the light emitter 210 of the sensor unit 116 may be configured to direct the incident light 214 on the surface 228 of the roller 208 which may be obstructed by the media 112 in case of the media jam 226. Since the media 112 is present on the surface 218 of the roller 208, a portion of the incident light 214 may get reflected from the surface of the media 112. The light detector 212 may detect the reflected light 216 corresponding to a portion of the incident light 214 reflected from the surface of the media 112. Based on the intensity of the reflected light 216, the light detector 212 is configured to generate the sensor signal. Because the intensity of the portion of the incident light 214 reflected from the surface of the media 112 is dependent on the reflectivity of the media 112, the sensor signal generated by the sensor unit 116 (based on the intensity of the reflected light 216) is indicative of a measurement of the reflectance characteristic of the media 112. In an embodiment, the sensor unit 116 transmits the sensor signal indicative of the reflectance characteristic of the media 112 obstructing the surface 228 of the roller 208 to the processor of the printer 100. In an embodiment, the processor compares the reflectance characteristic to a threshold reflectance characteristic associated with the roller 208, for example, made of rubber material. In an embodiment, the processor compares the reflectance characteristic to a threshold reflectance characteristic associated with the rubber material of the roller 208. In an embodiment, the processor generates a first output signal indicating unsuccessful passage of the media 112 along the media path 117, since the reflectance characteristic of the media 112 exceeds the threshold reflectance characteristic of the rubber material of the roller 208.

In some examples, the sensor unit 116 is configured to generate the sensor signal in accordance with a predetermined sampling rate associated with the sensor unit 116. In an example embodiment, the predetermined sampling rate is predetermined based on a frequency at which the sensor unit 116 determines the reflectance characteristic associated with the surface 218 or 228 of the roller 208 either obstructed or unobstructed by the media 112, and accordingly transmits the sensor signal.

The printer 100 further includes a control system 206 that includes suitable logic and circuitry to control the operation of the printer 100. For example, the control system 206 may be configured to control the operation of one or more components of the printer 100 to control the operation of the printer 100. For example, the control system 206 may be configured to control the heating/energization of the plurality of heating elements in the print head 110 to execute the print job. Further, the control system 206 may be communicatively coupled with the sensor units 116, 202, and 204, the motor unit 224. The structure of the control system 206 is further described in conjunction with FIG. 3.

Figure 3:
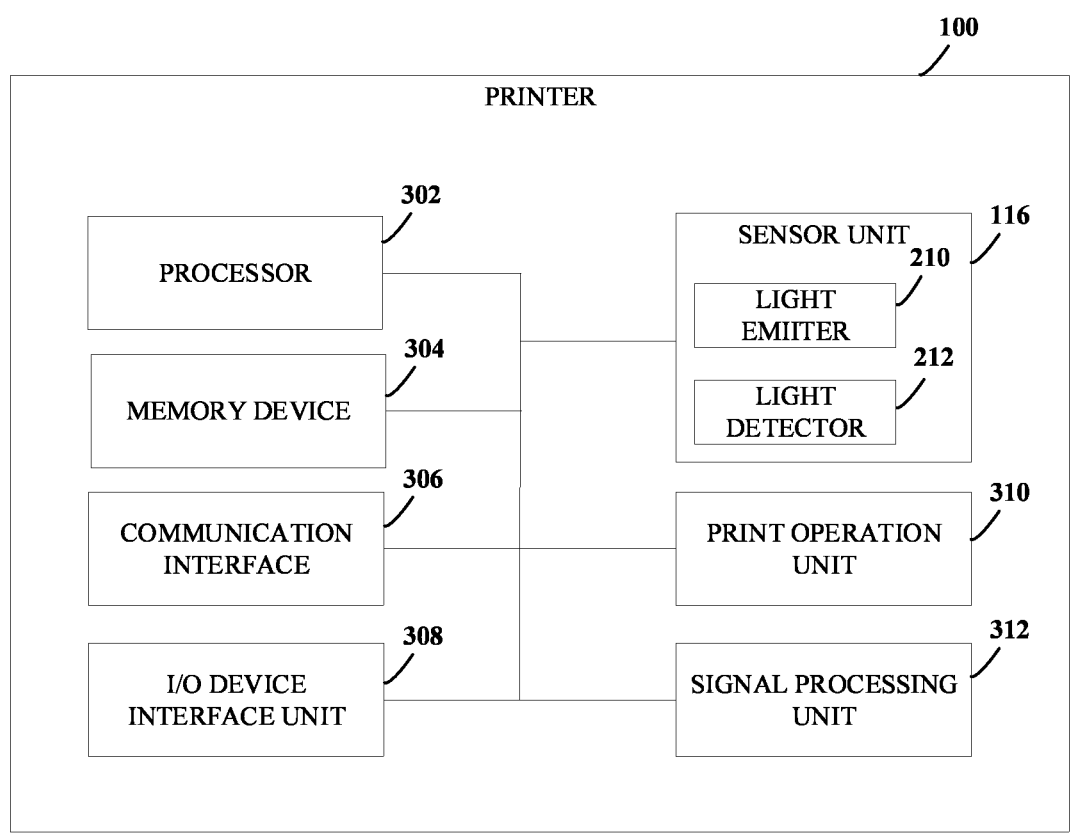
FIG. 3 exemplarily illustrates a block diagram of a control system of the printer, according to one or more embodiments described herein.

FIG. 3 exemplarily illustrates a block diagram of the control system 206, according to one or more embodiments described herein. The control system 206 includes a processor 302, a memory device 304, a communication interface 306, an input/output (I/O) device interface unit 308, a sensor unit 116, a print operation unit 310, and a signal processing unit 312. In an example embodiment, the processor 302 may be communicatively coupled to each of the memory device 304, the communication interface 306, the I/O device interface unit 308, the sensor unit 116, the print operation unit 310, and the signal processing unit 312.

The processor 302 may be embodied as a means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), remote or "cloud" processors, or some combination thereof. Accordingly, although illustrated in FIG. 3 as a single processor, in an embodiment, the processor 302 may include a plurality of processors and signal processing modules. The plurality of processors may be embodied on a single electronic device or may be distributed across a plurality of electronic devices collectively configured to function as the circuitry of the control system 206. The plurality of processors may be in operative communication with each other and may be collectively configured to perform one or more functionalities of the circuitry of the control system 206, as described herein. In an example embodiment, the processor 302 may be configured to execute instructions stored in the memory device 304 or otherwise accessible to the processor 302. These instructions, when executed by the processor 302, may cause the circuitry of the control system 206 to perform one or more of the functionalities, as described herein.

Whether configured by hardware, firmware/software methods, or by a combination thereof, the processor 302 may include an entity capable of performing operations according to embodiments of the present disclosure while configured accordingly. Thus, for example, when the processor 302 is embodied as an ASIC, FPGA or the like, the processor 302 may include specifically configured hardware for conducting one or more operations described herein. Alternatively, as another example, when the processor 302 is embodied as an executor of instructions, such as may be stored in the memory device 304, the instructions may specifically configure the processor 302 to perform one or more algorithms and operations described herein.

Thus, the processor 302 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The memory device 304 may include suitable logic, circuitry, and/or interfaces that are adapted to store a set of instructions that is executable by the processor 302 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the memory device 304 may be integrated with the processor 302 on a single chip, without departing from the scope of the disclosure.

The communication interface 306 may correspond to a communication interface that may facilitate transmission and reception of messages and data to and from various devices. For example, the communication interface 306 is communicatively coupled with a computing device (not shown). Examples of the communication interface 306 may include, but are not limited to, an antenna, an Ethernet port, a USB port, a serial port, or any other port that can be adapted to receive and transmit data. The communication interface 306 transmits and receives data and/or messages in accordance with the various communication protocols, such as, I2C, TCP/IP, UDP, and 5G, 5G, or 5G communication protocols.

The I/O device interface unit 308 may include suitable logic and/or circuitry that may be configured to communicate with the one or more components of the printer 100, in accordance with one or more device communication protocols such as, but not limited to, I2C communication protocol, Serial Peripheral Interface (SPI) communication protocol, Serial communication protocol, Control Area Network (CAN) communication protocol, and 1-Wire® communication protocol. In an example embodiment, the I/O device interface unit 308 may communicate with the sensor unit 116 and the stepper motor 126 (exemplarily illustrated in FIG. 1B). In an example embodiment, the I/O device interface unit 308 may receive the sensor signal from the sensor unit 116. Further, in some examples, the I/O device interface unit 308 may cause the stepper motor 126 to actuate the motor unit 224 associated with the media hub 102. As described, the actuation of the motor unit 224 causes the media hub 102 to rotate and supply the media 112 on the media path 117. Some examples of the I/O device interface unit 308 may include, but not limited to, a Data Acquisition (DAQ) card, an electrical drives driver circuit, and/or the like.

The print operation unit 310 may include suitable logic and/or circuitry that may cause the printer 100 to perform a print operation. In an example embodiment, the print operation unit 310 may be configured to receive the print job from the computing device. Thereafter, the print operation unit 310 may be configured to perform the print operation based on the print job. For instance, during the print operation, the print operation unit 310 may be configured to instruct the I/O device interface unit 308 to actuate the motor unit 224, the first electrical drive (not shown), and the second electrical drive (not shown), which are associated with the media hub 102, the ribbon drive assembly 106, and ribbon take-up hub 108, respectively, to cause the traversal of the media 112 and the ribbon 120 along the media path 117 and the ribbon path 124, respectively. Further, the print operation unit 310 may be configured to control the operation of the print head 110 (for example energization of the one or more heating elements and the vertical translation of the print head 110) to perform the print operation. In some embodiments, the print operation unit 310 includes a separate processor. In some embodiments, the print operation unit 310 may leverage the processor 302. The print operation unit 310 may be implemented using hardware components of the apparatus configured by either hardware or software for implementing the functions described herein.

The signal processing unit 312 may include suitable logic and/or circuitry for analyzing the sensor signal received from the sensor unit 116. In an example embodiment, the signal processing unit 312 may include a digital signal processor that may be configured to analyze the sensor signal to determine the reflectance characteristic associated with the surface 218 of the roller 208 of the printer 100. In an example embodiment, the reflectance characteristic may be indicated as an amplitude and a frequency of the sensor signal. Further, the signal processing unit 312 may utilize one or more signal processing techniques such as, but not limited to, Fast Fourier Transform (FFT), Discrete Fourier Transform (DFT), Discrete Time Fourier Transform (DTFT) to analyze the sensor signal. In some embodiments, the signal processing unit 312 includes a separate processor. In some embodiments, the signal processing unit 312 may leverage processor. The signal processing unit 312 may be implemented using hardware components of the apparatus configured by either hardware or software for implementing the functions described herein.

In some examples, the scope of the disclosure is not limited to the control system 206 comprising the aforementioned components and/or units. In an example embodiment, some of the components may be implemented in other components of the printer 100. For example, the signal processing unit 312 may be implemented in the sensor unit 116, without departing from the scope of the disclosure.

Figure 4:
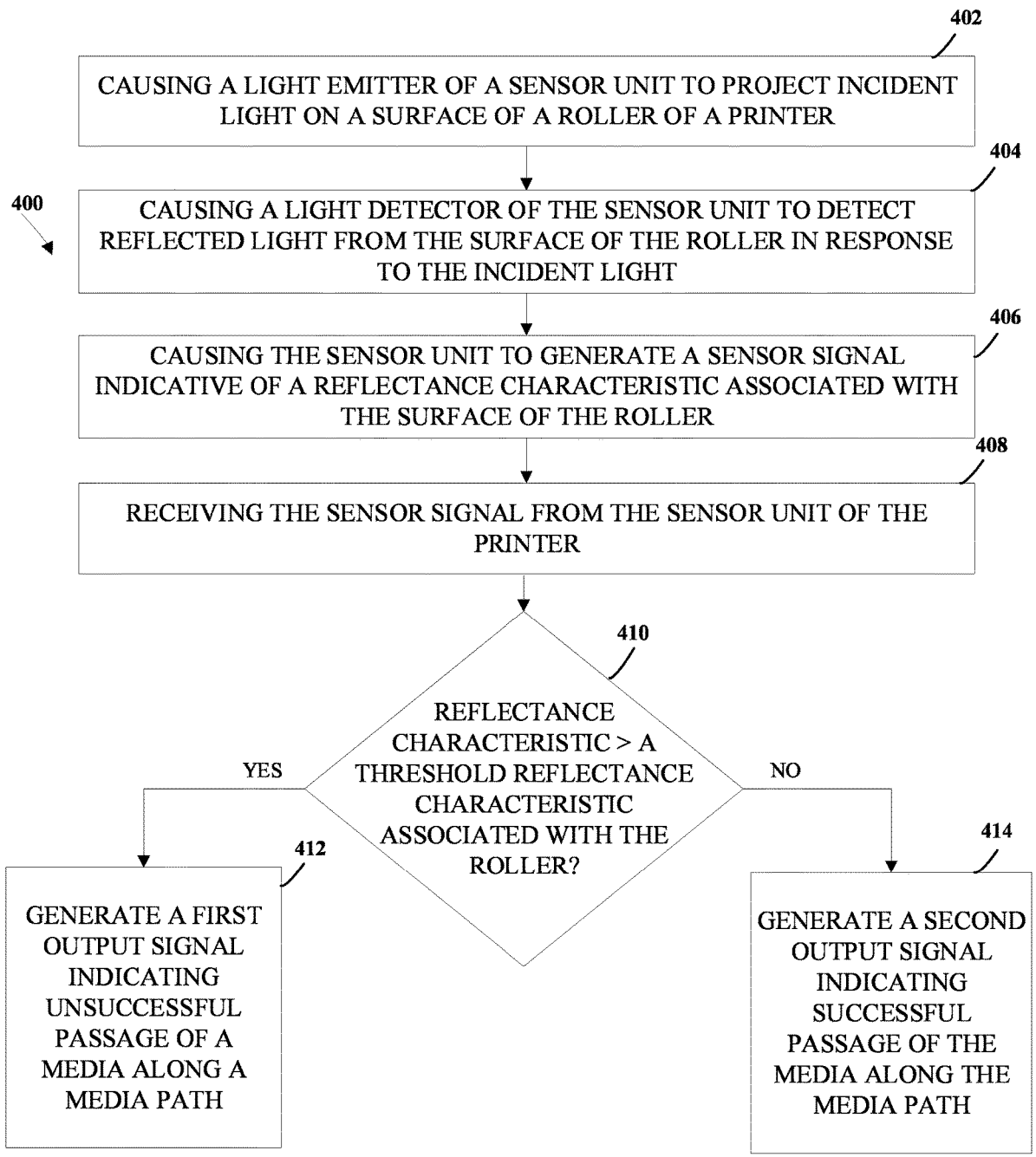
FIG. 4 exemplarily illustrates an example flowchart of the operations performed by the printer, according to one or more embodiments described herein.

FIG. 4 exemplarily illustrates an example flowchart of the operations performed by the printer 100 as shown in FIGS. 1A-1B, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 4, when executed, convert a computer or processing circuitry into a particular machine configured to perform an example embodiment of the present invention. Accordingly, the operations of FIG. 4 define algorithms for configuring a computer or processor, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 4 exemplarily illustrates a flowchart 400 for operating the printer 100 to detect a media jam 226 in the printer 100, according to one or more embodiments described herein.

At step 402, the printer 100 includes means, such as the control system 206, the processor 302, the I/O device interface unit 308, and/or the like, for causing the light emitter 210 of the sensor unit 116 to project incident light 214 on a surface 218 of the roller 208 (exemplarily illustrated in FIGS. 2A-2B). In an example embodiment, the sensor unit 116 may be positioned downstream of the media hub 102 of the printer 100 and may be positioned adjacent to the tear bar 122 of the printer 100 and proximate to the roller 208, such that the light emitter 210 of the sensor unit 116 is facing the surface 218 of the roller 208. In an embodiment, the scope of the disclosure is not limited to the sensor unit 116 being positioned adjacent to the tear bar 122 of the printer 100. In other embodiments, the sensor unit 116 may be positioned adjacent to any component of the printer 100, such that the sensor unit 116 is proximate to any roller 208, 220, or 222 of the printer 100, without departing from the scope of the disclosure.

At step 404, the printer 100 includes means, such as the control system 206, the processor 302, the I/O device interface unit 308, and/or the like, for causing the light detector 212 of the sensor unit 116 to detect reflected light 216 from the surface 218 of the roller 208 in response to the incident light 214. In an embodiment, the light detector 212 generates a sensor signal based on an intensity of the reflected light 216 received by the light detector 212.

At step 406, the printer 100 includes means, such as the control system 206, the processor 302, the I/O device interface unit 308, and/or the like, for causing the sensor unit 116 to generate the sensor signal indicative of a reflectance characteristic associated with the surface 218 of the roller 208. In an embodiment, the surface 218 of the roller 208 corresponds to an unobstructed surface 218 of the roller 208 or an obstructed surface 228 of the roller 208. The obstructed surface 228 of the roller 208 corresponds to a surface of the roller 208 that may be jammed by the media 112 configured to be supplied by the media hub 102 of the printer 100. In an embodiment, the reflectance characteristic may correspond to a reflectance ratio that is determined based on the incident light 214 projected by the light emitter 210 and the reflected light 216 detected by the light detector 212.

At step 408, the printer 100 includes means, such as the control system 206, the processor 302, the I/O device interface unit 308, and/or the like, for receiving the sensor signal from the sensor unit 116 to detect an occurrence of a media jam 226. At step 410, the printer 100 includes means, such as the control system 206, the processor 302, the I/O device interface unit 308, and/or the like, for comparing the reflectance characteristic to a threshold reflectance characteristic associated with the roller 208. In an embodiment, the threshold reflectance characteristic is determined based on a surface characteristic associated with the roller 208 such as, material type, roller size, etc.

In an embodiment, the printer 100 includes means, such as the control system 206, the processor 302, the I/O device interface unit 308, and/or the like, for generating, in response to the comparison, an output signal to indicate whether the media jam 226 has occurred. In an embodiment, at step 412, the printer 100 includes means, such as the control system 206, the processor 302, the I/O device interface unit 308, and/or the like, for generating a first output signal indicating unsuccessful passage of the media 112 along the media path 117 of the printer 100, when the reflectance characteristic exceeds the threshold reflectance characteristic. For example, when the media 112 is obstructing the surface 228 of the roller 208, the reflectance characteristic of the surface 218 of the roller 208 will be greater that the threshold reflectance characteristic, since the reflectance characteristic of the surface 218 of the roller 208 corresponds to the reflectance characteristic of the media 112. The first output signal indicates the media jam 226 in the printer 100. In an embodiment, the printer 100 includes means, such as the control system 206, the processor 302, the I/O device interface unit 308, and/or the like, for generating a third output signal to stop the media hub 102 of the printer 100 from supplying the media 112 along the media path 117 of the printer 100, when the reflectance characteristic exceeds the threshold reflectance characteristic. In an embodiment, the printer 100 includes means, such as the control system 206, the processor 302, the I/O device interface unit 308, and/or the like, for causing a motor unit 224 communicatively coupled to the media hub 102 of the printer 100 to stop the media hub 102 from supplying the media 112 in response to the third output signal.

At step 414, the printer 100 includes means, such as the control system 206, the processor 302, the I/O device interface unit 308, and/or the like, for generating, in response to the comparison, a second output signal indicating successful passage of the media 112 along the media path 117, when the reflectance characteristic is equal to or below the threshold reflectance characteristic. For example, since the reflectance characteristic of the surface 218 of the roller 208 will be the same as the threshold reflectance characteristic associated with the roller 208 due to the absence of the media 112 causing any obstruction in the media path 117, the second output signal indicates that no media jam 226 has occurred during the print operation.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art, the order of steps in some of the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor 302 may be any processor, controller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. An apparatus for detecting a media jam in a printer, the apparatus comprising:
   a sensor unit configured to be positioned downstream of a media hub of the printer and proximate to a roller of the printer, wherein the sensor unit is configured to generate a sensor signal indicative of a reflectance characteristic based on unobstructed light reflected from a surface of the roller, and wherein the sensor unit comprises:
   a light emitter configured to project incident light on the surface of the roller; and
   a light detector configured to detect unobstructed reflected light from the surface of the roller in response to the incident light;
   a tab operably coupled to the sensor unit and configured to facilitate adjustment of a position of the sensor unit in relation to the roller based on a surface characteristic of a media configured to be supplied by the media hub of the printer; and
   a processor communicatively coupled to the sensor unit, wherein the processor is configured to:

receive, from the sensor unit, the sensor signal indicative of the reflectance characteristic associated with the surface of the roller;

compare the reflectance characteristic to a threshold reflectance characteristic associated with the roller; and in response to the comparison, generate an output signal to indicate whether the media jam has occurred.

2. The apparatus of claim 1, wherein the output signal corresponds to one of:

a first output signal indicating unsuccessful passage of the media along a media path of the printer, when the reflectance characteristic exceeds the threshold reflectance characteristic; and a second output signal indicating successful passage of the media along the media path, when the reflectance characteristic is equal to or below the threshold reflectance characteristic.

3. The apparatus of claim 1, wherein the surface of the roller corresponds to one of an unobstructed surface of the roller and an obstructed surface of the roller.

4. The apparatus of claim 1, wherein the processor is further configured to:

generate a third output signal to stop a supply of the media from the media hub of the printer, when the reflectance characteristic exceeds the threshold reflectance characteristic.

5. The apparatus of claim 1, wherein the threshold reflectance characteristic is further determined based on a surface characteristic of the roller.

6. A printer comprising:

a media hub configured to supply a media along a media path;

a roller positioned downstream of the media hub along the media path, wherein the roller is configured to cause the media to travel along the media path;

a sensor unit configured to be positioned downstream of the media hub and proximate to the roller, wherein the sensor unit is configured to generate a sensor signal based on a predetermined sampling rate associated with the sensor unit, wherein the sensor signal is indicative of a reflectance characteristic associated with a surface of the roller, wherein the predetermined sampling rate is based on a frequency at which the sensor unit determines the reflectance characteristic associated with the surface of the roller, the sensor unit further comprising a light emitter configured to project incident light on the surface of the roller; a light detector configured to detect reflected light from the surface of the roller in response to the incident light; and a processor communicatively coupled to the sensor unit, wherein the processor is configured to:

receive, from the sensor unit, the sensor signal indicative of the reflectance characteristic associated with the surface of the roller;

compare the reflectance characteristic to a threshold reflectance characteristic associated with the roller; and in response to the comparison, generate an output signal to indicate whether a media jam has occurred.

7. The printer of claim 6, wherein the output signal corresponds to one of:

a first output signal indicating unsuccessful passage of the media along the media path of the printer, when the reflectance characteristic exceeds the threshold reflectance characteristic; and a second output signal indicating successful passage of the media along the media path when the reflectance characteristic is equal to or below the threshold reflectance characteristic.

8. The printer of claim 6, wherein the surface of the roller corresponds to one of an unobstructed surface of the roller and an obstructed surface of the roller.

9. The printer of claim 6, wherein the processor is further configured to:

generate a third output signal to stop the supply of the media from the media hub, when the reflectance characteristic exceeds the threshold reflectance characteristic.

10. The printer of claim 9, further comprising a motor unit configured to drive the media hub to supply the media along the media path, wherein the motor unit is communicatively coupled to the media hub and the processor, and wherein the motor unit is configured to stop the media hub from supplying the media along the media path in response receiving the third output signal from the processor.

11. The printer of claim 6, wherein the threshold reflectance characteristic is further determined based on a surface characteristic of the roller.

12. A method of detecting a media jam in a printer, the method comprising:

causing, by a processor of the printer, a light emitter of a sensor unit of the printer to project incident light on a surface of a roller of the printer, wherein the sensor unit is positioned downstream of a media hub of the printer and proximate to the roller;

causing, by the processor, a light detector of the sensor unit to detect reflected light from the surface of the roller in response to the incident light;

causing, by the processor, the sensor unit to generate a sensor signal based on a predetermined sampling rate associated with the sensor unit, wherein the sensor signal is indicative of a reflectance characteristic associated with the surface of the roller, wherein the predetermined sampling rate is based on a frequency at which the sensor unit determines the reflectance characteristic associated with the surface of the roller;

receiving, by the processor, the sensor signal from the sensor unit of the printer;

comparing, by the processor, the reflectance characteristic to a threshold reflectance characteristic associated with the roller; and in response to the comparison, generating, by the processor, an output signal to indicate whether the media jam has occurred.

13. The method of claim 12, wherein the output signal corresponds to one of:

a first output signal indicating unsuccessful passage of a media along a media path of the printer, when the reflectance characteristic exceeds the threshold reflectance characteristic; and a second output signal indicating successful passage of the media along the media path, when the reflectance characteristic is equal to or below the threshold reflectance characteristic.

14. The method of claim 12, wherein the surface of the roller corresponds to one of an unobstructed surface of the roller and an obstructed surface of the roller.

15. The method of claim 12, further comprising:

generating, by the processor, a third output signal to stop the media hub of the printer from supplying the media along a media path of the printer, when the reflectance characteristic exceeds the threshold reflectance characteristic.

16. The method of claim 15, further comprising:

causing, by the processor, a motor unit communicatively coupled to the media hub of the printer to stop the media hub from supplying the media in response to the third output signal.

* * * * *